(12) United States Patent
Konno

(10) Patent No.: US 7,524,254 B2
(45) Date of Patent: Apr. 28, 2009

(54) GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 164 days.

(21) Appl. No.: 11/356,612

(22) Filed: Feb. 17, 2006

(65) Prior Publication Data

US 2006/0205548 A1    Sep. 14, 2006

(30) Foreign Application Priority Data

Mar. 9, 2005    (JP) .............................. 2005-065574

(51) Int. Cl.
*F16H 7/18*    (2006.01)
(52) U.S. Cl. ..................................... 474/111
(58) Field of Classification Search ................. 474/101, 474/109, 110, 111, 140
See application file for complete search history.

(56) References Cited

U.S. PATENT DOCUMENTS

| 5,045,032 A | 9/1991 | Suzuki et al. |
| 5,184,983 A | 2/1993 | Shimaya et al. |
| 5,318,482 A * | 6/1994 | Sato et al. .................... 474/111 |
| 5,820,502 A * | 10/1998 | Schulze ...................... 474/140 |
| 6,612,952 B1 * | 9/2003 | Simpson et al. ............. 474/111 |
| 2002/0061799 A1 * | 5/2002 | Young ........................ 474/111 |
| 2006/0040774 A1 | 2/2006 | Hirayama et al. |

FOREIGN PATENT DOCUMENTS

| EP | 1 441 149 A1 | 7/2004 |
| GB | 2351136 A | 12/2000 |
| JP | 7-36210 | 8/1995 |
| JP | 2519476 | 9/1996 |

* cited by examiner

*Primary Examiner*—Vicky A Johnson
(74) *Attorney, Agent, or Firm*—Howson & Howson LLP

(57) ABSTRACT

In a sliding contact chain guide of the kind used in the timing transmission of an internal combustion engine, a synthetic resin guide shoe is attached to a pivoting support arm by protrusions formed as unitary parts of the shoe, which engage notches formed in the support arm. L-shaped protrusions formed on one side edge of the shoe engage both the back face and one side edge of the arm, and strip shaped protrusions on the opposite side edge of the shoe engage the opposite side edge of the arm. An L-shaped protrusion is formed adjacent one end of the shoe on the edge having the strip-shaped protrusions.

4 Claims, 9 Drawing Sheets

GUIDE FOR TRANSMISSION DEVICE

CROSS REFERENCE TO RELATED APPLICATIONS

This application claims priority on the basis of Japanese application 2005-065574, filed Mar. 9, 2005. The disclosure of Japanese application 2005-065574 is hereby incorporated by reference.

FIELD OF THE INVENTION

This invention relates to sliding contact guides for endless, flexible, traveling, transmission media (e.g., roller chains, silent chains, toothed belts, or the like), used to transmit power from a driving shaft to one or more driven shafts in a transmission such as the timing drive of an internal combustion engine.

BACKGROUND OF THE INVENTION

A sliding contact guide can be in the form of a fixed guide, or a pivoted tensioner lever. In a typical tensioner lever, a synthetic resin shoe, having a surface on which a chain or other transmission medium can slide, is connected to a supporting arm. The lever assembly, consisting of supporting arm with the shoe attached to it, rotates about a pivot shaft fixed to an engine block and projecting through a hole formed adjacent one end of the supporting arm. The supporting arm is engaged, at a location remote from the pivot axis, by the plunger of a tensioner, the housing of which is also fixed to the engine block.

FIGS. 7 and 8 show a typical tensioner lever 500, in which plural L-shaped protrusions 511 are provided along one long edge of an elongated shoe 510 for connecting the shoe to an elongated supporting arm 520. Plural strip-shaped protrusions 512 are provided along the other long edge of the shoe, and a U-shaped hook 513, formed at one end of the shoe, engages the end of the arm adjacent the pivot axis. Thus, the hook 513 is located at the end of the tensioner lever which the transmission medium approaches as it travels from a driving sprocket toward the lever. The L-shaped protrusions 511, the strip-shaped protrusions 512, and the hook 513, prevent the shoe from floating with respect to the supporting arm 520. The typical tensioner lever shown in FIGS. 7 and 8 is also described in U.S. Pat. No. 5,184,983.

FIGS. 9 and 10 show a typical fixed guide 600, also known as a "guide rail," in which a shoe 610 is engaged with a support 620. The shoe has a hook-shaped end 611, which engages an end 621 of the support 620 at a location at which the guide is approached by a transmission medium as the medium travels from a driven sprocket toward the guide. L-shaped elements 612 are formed along both long edges of the shoe for attachment of the shoe to a flange 622 of the support. This typical fixed guide is described in Japanese Utility Model Publication No. Hei.-36201, and a similar fixed guide is described in U. S. Pat. No. 5,045,032.

In the case of the tensioner lever 500 as shown in FIGS. 7 and 8, in which the shoe is held on the support by a combination of the U-shaped hook 513, L-shaped protrusions along only one long edge of the shoe, and strip-shaped protrusions along the other long edge of the shoe, the shoe 510 is liable to disengage from the arm 520 in operation. Since the shoe 510 is formed of synthetic resin, it undergoes repeated elongation and shrinkage due to temperature changes, especially when used in the timing drive of an engine. The elongation of the shoe can cause a gap to form between the shoe 510 and the arm 520. Because of the gap, the shoe 510 can move longitudinally relative to the supporting arm, and this longitudinal movement can allow the U-shaped end hook 513 to become disengaged from the arm.

In the case of the fixed guide 600 in FIGS. 9 and 10, the L-shaped elements 612 on one edge of the shoe are nearly opposite those on the other edge. Consequently, it is difficult to connect the shoe 610 with the flange 622 of the support arm during assembly of the tensioner lever.

The principal object of this invention is to solve the above-mentioned problems. More specifically, the invention provides a guide in which the shoe and the shoe support can be easily connected to each other during assembly of the guide. A secure connection between the shoe and the support is provided so that disengagement of the shoe from the support during operation can be avoided, and stable travel of the transmission medium is ensured.

SUMMARY OF THE INVENTION

The sliding contact guide according to the invention comprises an elongated supporting arm, and an elongated synthetic resin shoe secured to the arm. The supporting arm has a front face, a back face, a first side and a second side, all extending longitudinally from a front end toward a back end. The first side has a first set of longitudinally spaced notches, and the second side has a second set of longitudinally spaced notches.

In a preferred embodiment, the sets of notches are disposed in a zig-zag configuration. That is, the notches are disposed relative to each other so that, for each notch in one of the sets, a next notch, of the notches of the two sets, proceeding longitudinally along the arm, is a notch of the other set. Moreover, in the zig-zag configuration, for each pair of adjacent notches of each set, a notch of the other set is disposed at a longitudinal position between the longitudinal positions of the notches of the pair.

The elongated shoe is positioned on the front face of the elongated arm, and has a surface against which an endless power transmission is slidable. The shoe has front and back ends adjacent the front and back ends of the arm respectively, and opposite first and second longitudinal edges adjacent the first and second sides of the arm respectively. The shoe has a first set of protrusions, each extending from its first longitudinal edge into a notch of the first set and a second set of protrusions, each extending from its second longitudinal edge into a notch of the second set. Each of a plurality of the protrusions of the first set is an L-shaped protrusion having a leg engaged with the back face of the arm. A protrusion of the second set, longitudinally spaced from the L-shaped protrusions of the first set, is also an L-shaped protrusion having a leg engaged with the back face of the arm. The remaining protrusions of the second set are strip-shaped protrusions which do not have legs engageable with the back face of the arm. Preferably, the L-shaped protrusion of the second set is located adjacent one of the front and back ends of the shoe. The shoe is held against longitudinal and lateral movement relative to the supporting arm by cooperation of the notches with the protrusions, and held against movement away from the front face of the supporting arm by the L-shaped projections.

Because one edge of the shoe has a series of L-shaped protrusions, and another L-shaped protrusion is provided on the other edge of the shoe, unintentional disengagement of the shoe from the arm is prevented. The longitudinal displacement of L-shaped protrusion of the second set of protrusions from the L-shaped protrusions of the first set allows the shoe to be attached to the support arm easily in the assembly process. When the notches on the support arm are arranged in a zig-zag configuration, the protrusions of both sets on the shoe, each of which cooperates with a respective one of the notches, are also arranged in a zig-zag configuration. The zig-zag configuration of the protrusions, further facilitates assembly of the lever because the protrusions along one edge of the shoe can be more easily displaced by bending relative to the nearest protrusions on the other edge of the shoe.

The L-shaped protrusions on both sides of the shoe prevent disengagement of the shoe from the support even if the traveling transmission medium vibrates or flutters violently during operation. In addition, the shoe remains attached to the support arm even when changes in engine temperature induce thermal expansion and longitudinal movement of the shoe. The arrangement of protrusions and notches also prevents the shoe from being installed backward on the support.

In a preferred embodiment of the guide, a bag-like receptacle is formed on an end of the shoe remote from the L-shaped protrusion of the second set. The receptacle receives one of the ends of the support arm and is open toward the second longitudinal edge of the shoe. The receptacle effectively acts as an endmost L-shaped protrusion of the first set, having increased strength. The receptacle additionally resists longitudinal movement of the shoe relative to the support. In this embodiment, as in the others, the arrangement of protrusions and notches also prevents the shoe from being installed backward on the support.

DETAILED DESCRIPTION OF THE PREFERRED EMBODIMENTS

Figure 1:
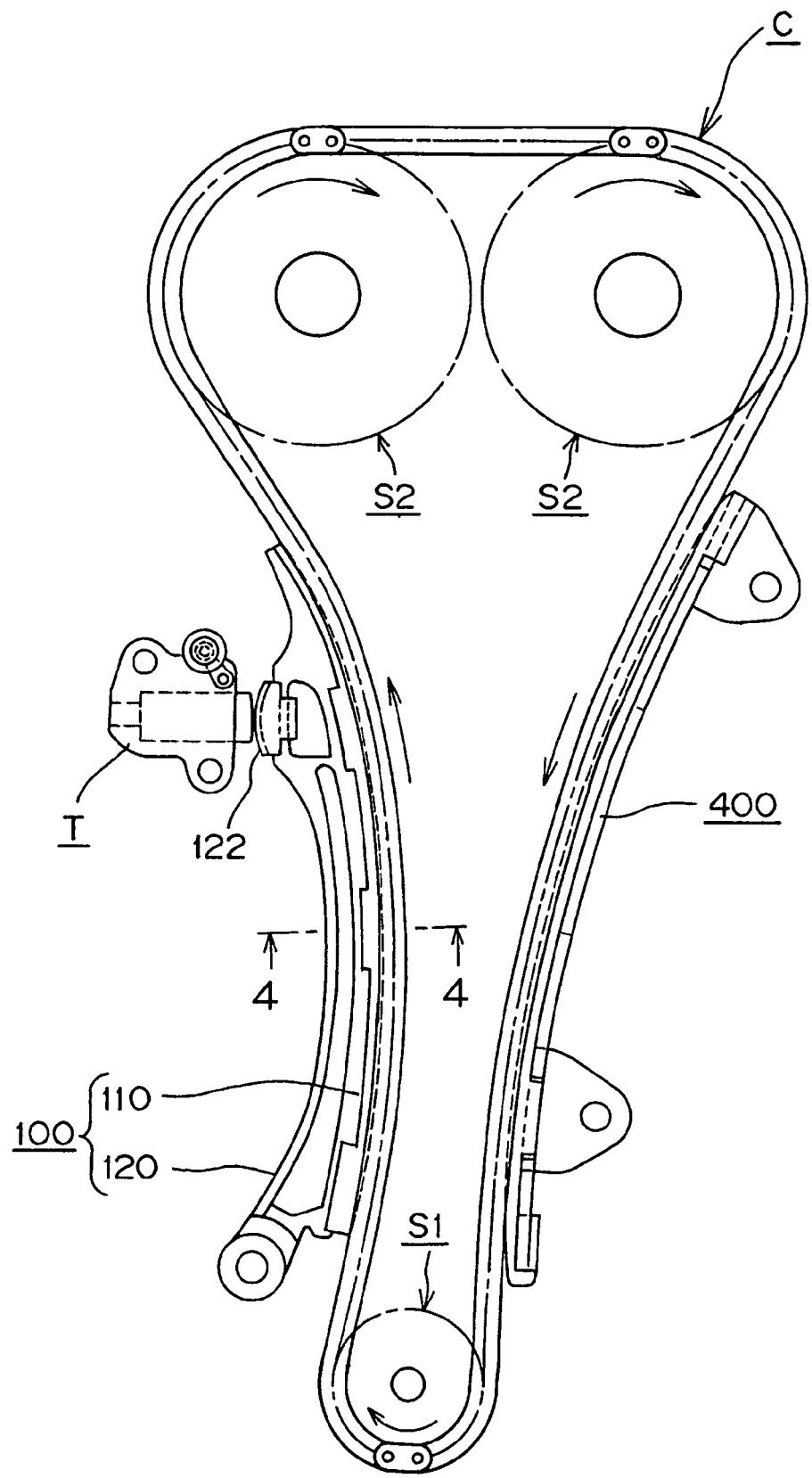
FIG. 1 is a schematic elevational view of an engine timing transmission incorporating a sliding contact guide in accordance with the invention as a tensioner lever.

In the engine timing transmission shown in FIG. 1, a movable guide 100 and a fixed guide 400, are provided respectively on the slack and tension sides of a drive chain C, the chain being driven by a crankshaft sprocket S1 and driving two camshaft sprockets S2. The movable guide 100 is urged by a tensioner T into sliding contact with the chain C. The fixed guide 400 is secured to the engine at both ends while the movable guide 100 is pivoted at one end. Both guides control the path of travel of the chain C.

Figure 2:
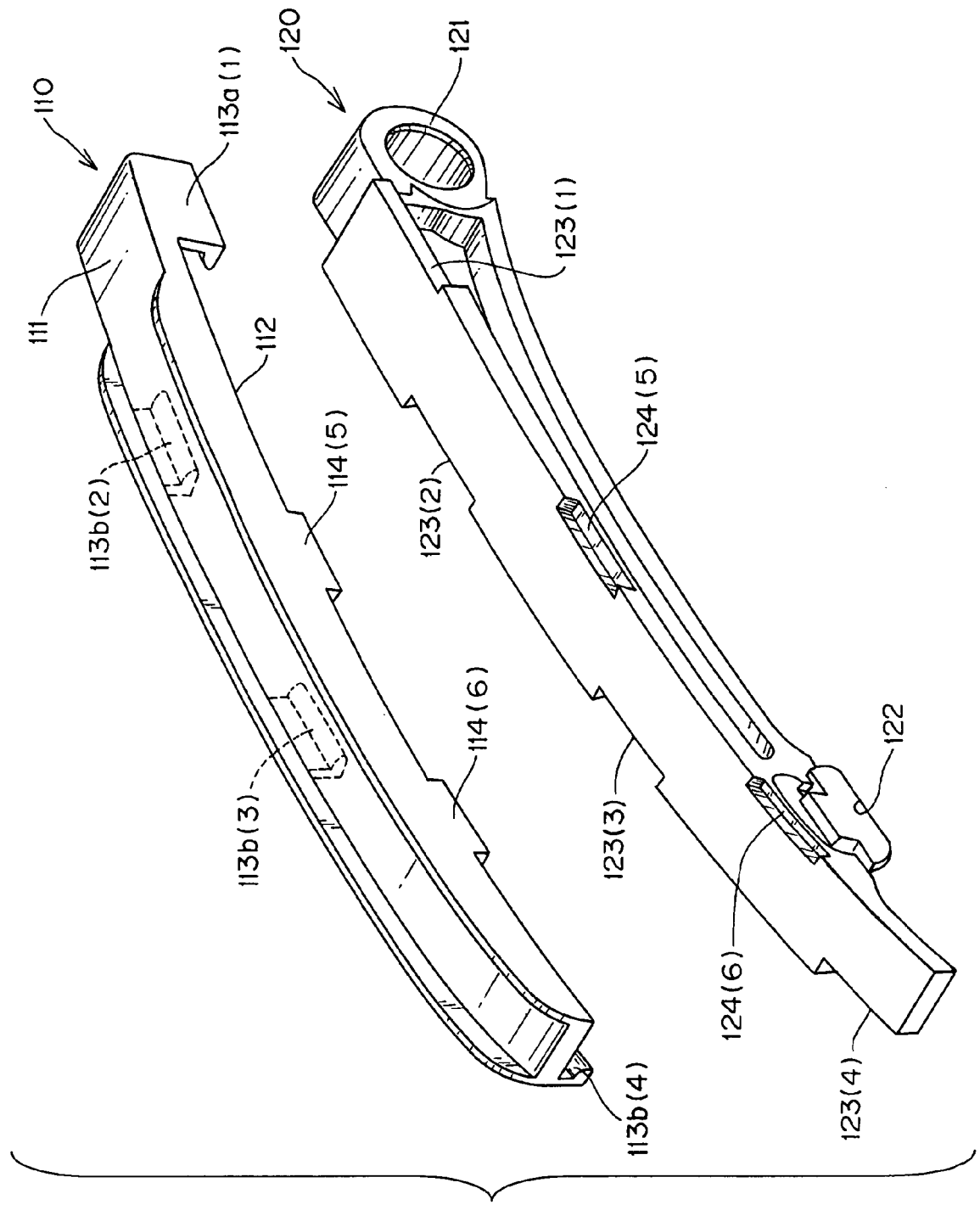
FIG. 2 is an exploded view of the guide in FIG. 1.

As shown in FIG. 2, the guide 100 comprises an elongated shoe 110, having a generally arc-shaped surface 111 with which a transmission chain comes into sliding contact, and an elongated support arm 120 which is engaged with surface 112 of the shoe, surface 112 facing in the direction opposite to the direction in which the arc-shaped sliding contact surface 111 faces.

Figure 3:
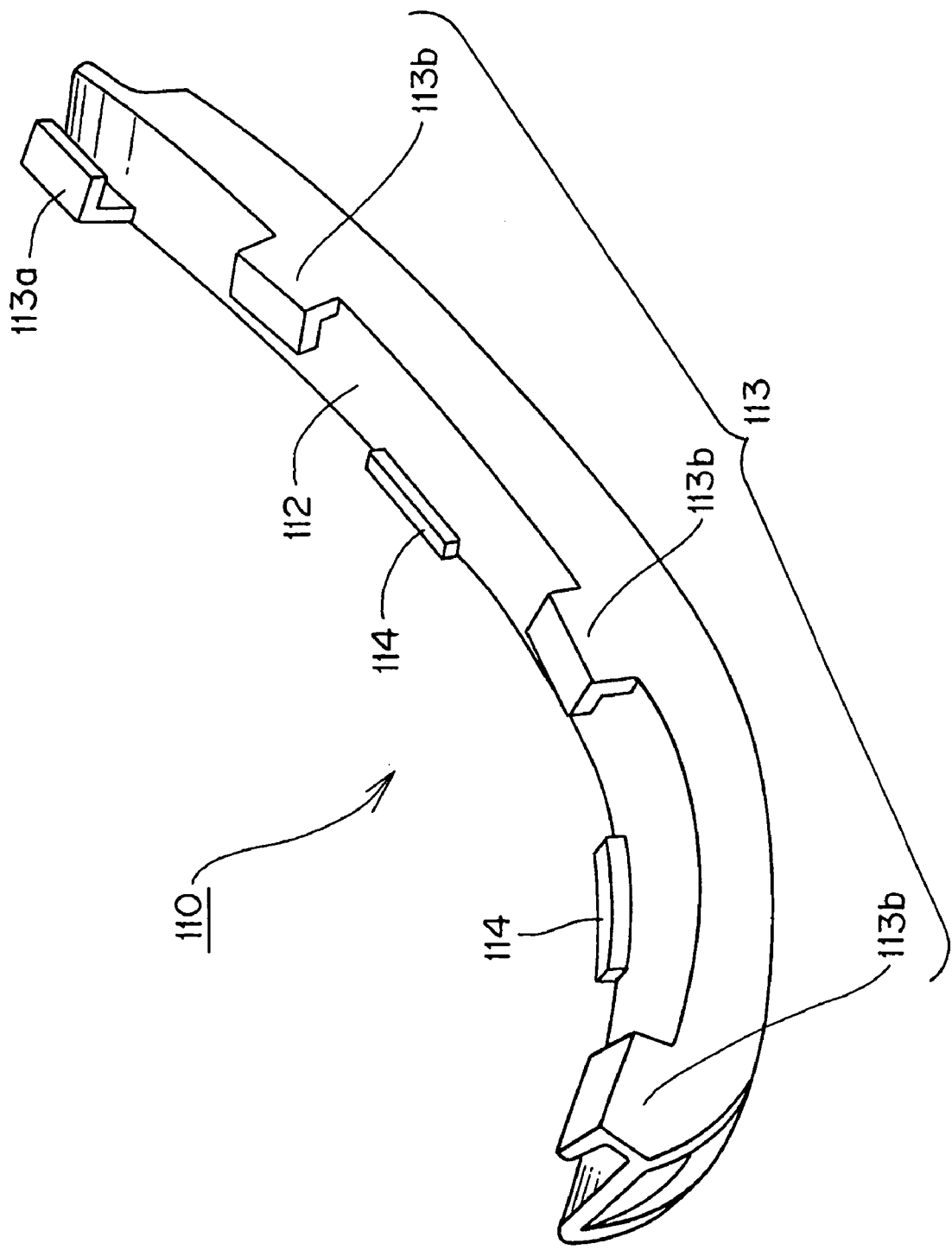
FIG. 3 is a perspective view showing the opposite side of the shoe depicted in FIG. 2 as one of the components of the guide.

In the embodiment depicted in FIGS. 2 and 3, the shoe 110 has a plurality of L-shaped protrusions 113b, which are disposed along one edge of the shoe. As shown in FIG. 2, these L-shaped protrusions, 113b(2), 113b(3) and 113b(4) are engageable respectively with notches 123(2), 123(3) and 123(4), formed in a side of a support arm 120 the support arm having a hole 121 at one end for receiving a shaft on which the arm is pivoted. The parts of the L-shaped protrusions 113b that are connected directly to the body of the shoe extend through the notches and their engagement with the ends of the notches resists longitudinal movement of the shoe relative to the support arm. The L-shaped protrusions 113b have legs, which engage a bottom side of the flange of the upper flange of the support arm 120.

Strip-shaped protrusions 114, as shown in FIG. 3, are provided in spaced relationship on the opposite edge of the shoe. As shown in FIG. 2, these strip-shaped protrusions 114(5) and 115(6) are engageable in notches 124(5) 124(6), respectively in the support arm. The engagement of the strip shaped protrusions with the ends of the notches also resists longitudinal movement of the shoe relative to the support arm. The notches that receive the strip-shaped protrusions can have bottoms, as shown in FIG. 2. Alternatively, however, the notches can extend all the way through the flange of the support arm.

An L-shaped protrusion 113a, as shown in FIG. 2, is located on the edge of the shoe 110 opposite to the edge on which L-shaped protrusions are located. L-shaped protrusion 113a is displaced longitudinally relative to L-shaped protrusions 113b on the opposite edge of the shoe, and is preferably located adjacent one end of the shoe and positioned to engage notch 123(1) in the support arm.

Preferably, the notches are disposed along the support arm in a zig-zag arrangement, that is, in an arrangement in which the notches are disposed relative to each other so that, for each notch in one of the sets, e.g. notch 123(3), a next notch, of the notches of the two sets, proceeding longitudinally along the arm, is a notch of the other set, e.g., notch 124(5). Moreover, in the zig-zag configuration, for each pair of adjacent notches of each set; e.g., notches 123(2) and 123(3), a notch of the other set, e.g., notch 124(5) is disposed at a longitudinal position between the longitudinal positions of the notches of the pair. This definition of the zig-zag relationship does not exclude the possibility of additional notches in the support arm. Those additional notches, however, would not be notches of the first or second "sets". Preferably, however, there are no additional notches, in which case all the notches on one side of the support arm are notches of a first set, and all the notches on the other side of the support arm are notches of a second set.

The strip shaped protrusions 114 and L-shaped protrusion 113a on one edge of the shoe 113 are preferably in zig-zag relationship with the L-shaped protrusions 113b on the opposite edge of the shoe, and positioned to engage notches in the supporting arm. Thus, in the preferred arrangement, no protrusion on one edge of the shoe is directly opposed to a protrusion on the opposite edge of the shoe. Preferably, the longitudinal spacing of the protrusions is uniform; that is, the spacing between the protrusions of a successive pair, one being on one edge of the shoe and the other being on the opposite edge of the shoe, is substantially uniform.

Figure 4:
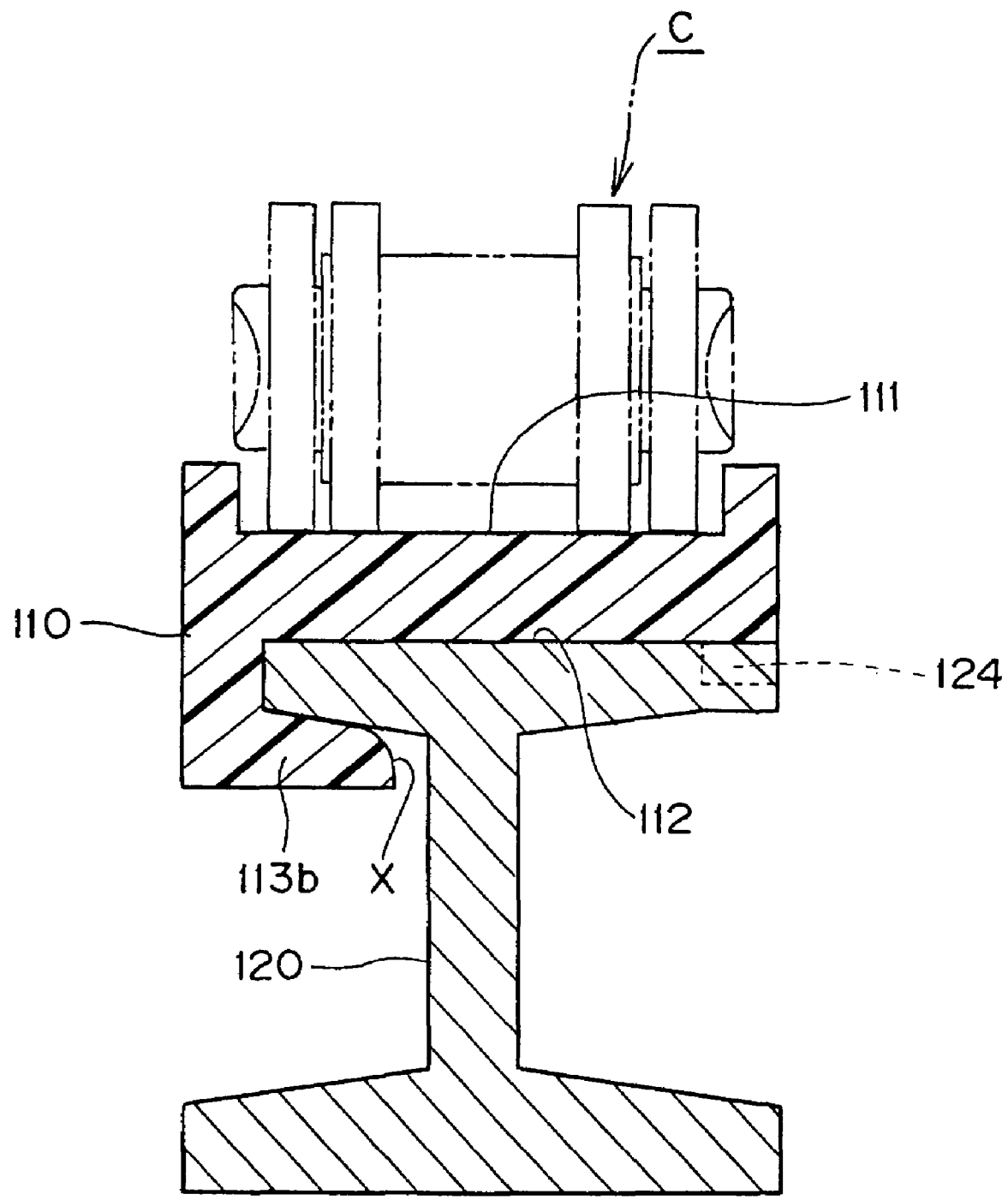
FIG. 4 is cross-sectional view of the guide of FIG. 1, taken on section plane 4-4 in FIG. 1.

As shown in FIG. 4, the legs of protrusions 113b which engage the back side of the flange of the support arm 120 are tapered and have a curved end X to allow smooth engagement with the flange of the support arm. Preferably, the flange of the support arm is also tapered so that surface contact exists between the leg of the L-shaped protrusion and the back of the flange when the shoe is fully engaged with the support arm. The L-shaped protrusion 113a on the opposite edge of the shoe can have, and preferably does have, a shape similar to that of the L-shaped protrusions 113b.

In assembling the guide the L-shaped protrusion 113a(1) on the shoe, is fitted to a corresponding notch 123(1) of the support arm. Next, the L-shaped protrusions 113b(2), 113b (3), and 113b(4) of the shoe are engaged with the corresponding notches 123(2), 123(3), and 123(4) respectively. These L-shaped protrusions are sequentially engaged with their corresponding notches by pushing the shoe so that the strip-shaped protrusions slide across the face of the support arm, while slightly twisting the shoe so that the L-shaped protrusions can receive an edge of the notches in the support arm. The strip-shaped protrusions 114(5) and 114(6) snap into their corresponding notches 124(5) and 124(6) as the L-shaped protrusions 113b enter their corresponding notches. Thus, in the guide 100, as shown in FIG. 4, the strip-shaped protrusions 114 of the shoe 110 are positioned in their corresponding notches, and the L-shaped protrusions 113b of the shoe 110 are engaged with their corresponding notches such that the shoe and the support arm are securely attached. The engagement of the L-shaped protrusion 113a with its notch 123(1) prevents the shoe from becoming disengaged from the support arm while the transmission chain is in sliding contact with the sliding contact surface 111 of the shoe 110.

When disassembling the guide, by twisting the shoe, the strip-shaped protrusions 114 can be disengaged from their notches 124(5) and 124(6). When the strip-shaped protrusions are disengaged from their notches, end of the shoe remote from the L-shaped protrusion 113a can be moved laterally, for disengagement of L-shaped protrusions 113b from their notches 123(2), 123(3) and 123(4). Then, when the L-shaped protrusions 113b are disengaged from their notches, L-shaped protrusion 113a can be disengaged from its notch 123(1) for completion of the removal of the shoe from the support arm.

Providing an L-shaped protrusion 113a on the edge of the shoe opposite the edge having the other L-shaped protrusions avoids unintended detachment of the shoe from the support arm even when the transmission chain vibrates or flutters and when or the synthetic resin shoe thermally expands or contracts as a result of a temperature change. The zig-zag arrangement of the protrusions further facilitates attachment and detachment of the shoe without significantly increasing the risk of an unintended detachment.

Figure 5:
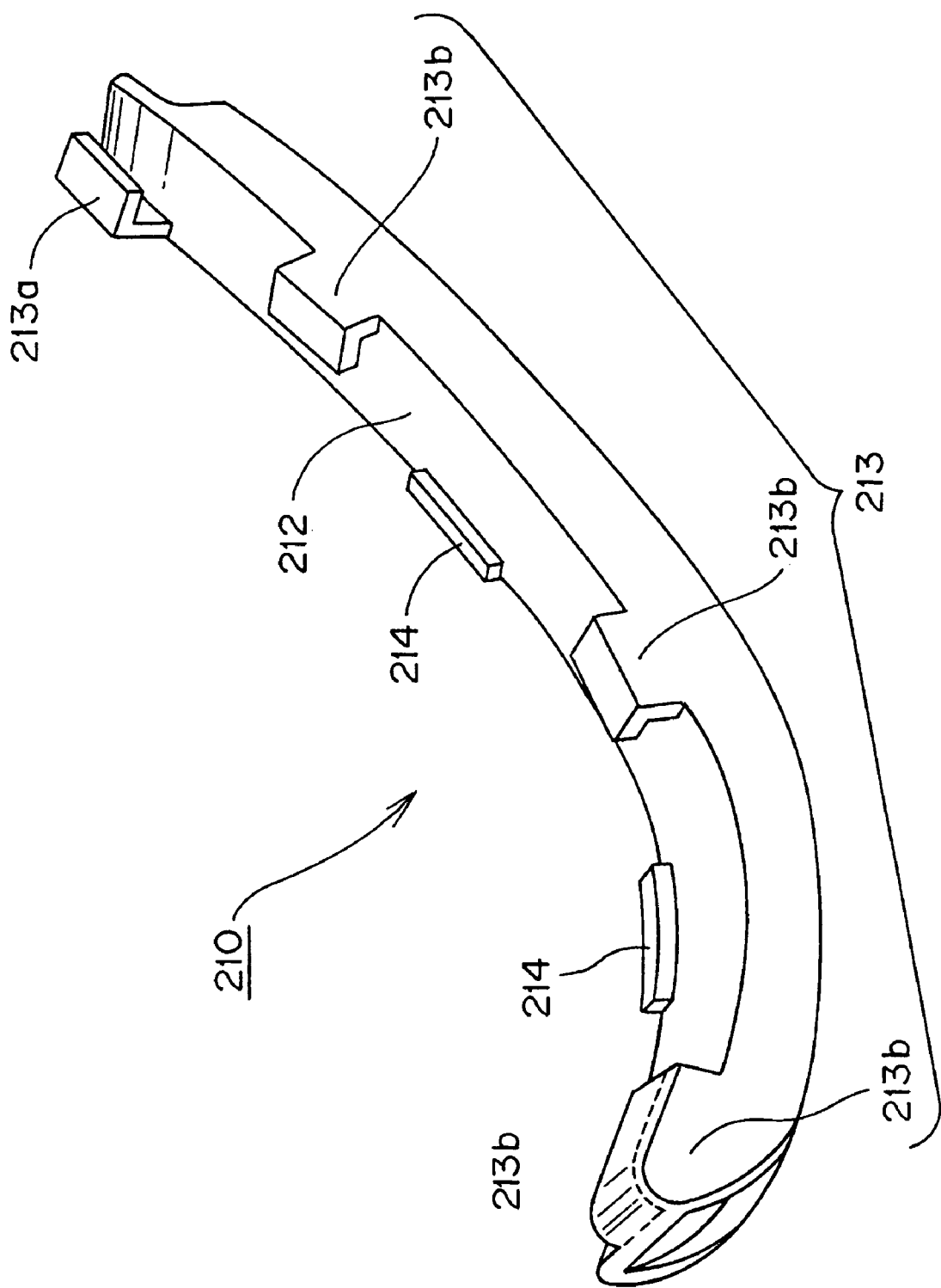
FIG. 5 is a perspective view, corresponding to FIG. 3, but showing a modified version of the shoe.
Figure 6:
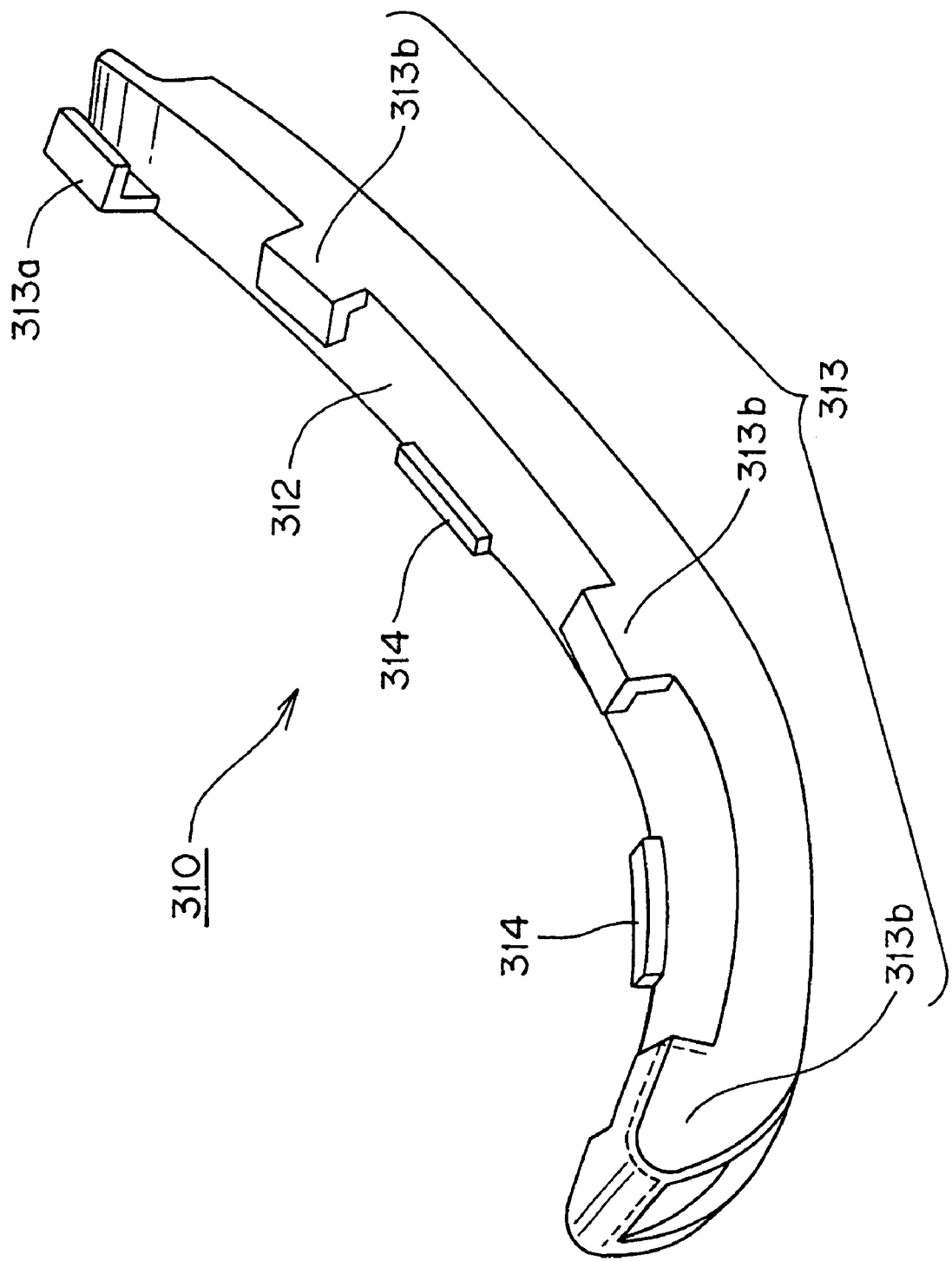
FIG. 6 is a perspective view, corresponding to FIGS. 3 and 5, but showing another modified version of the shoe.
Figure 7:
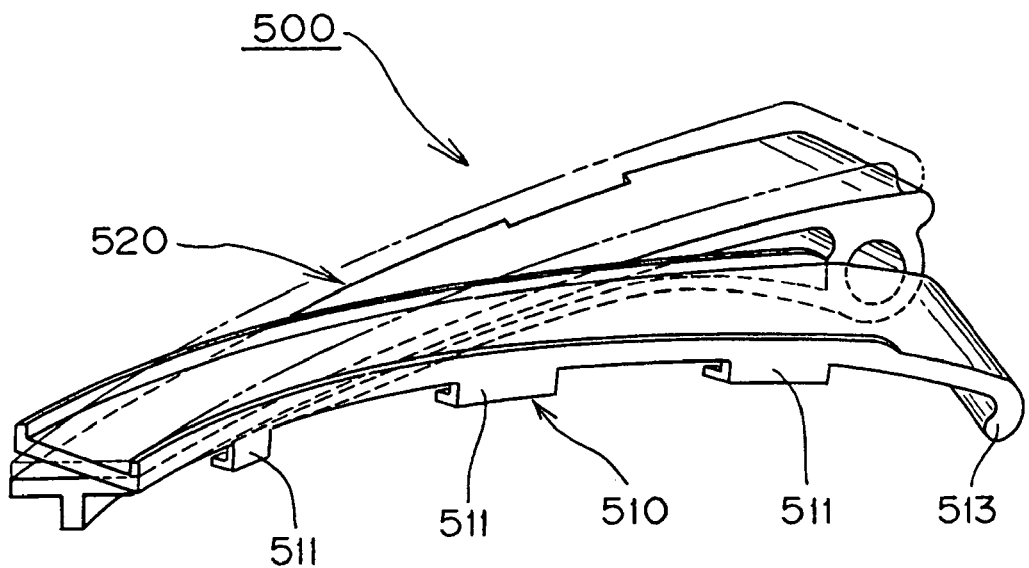
FIG. 7 is an exploded perspective view of a conventional movable guide.
Figure 8:
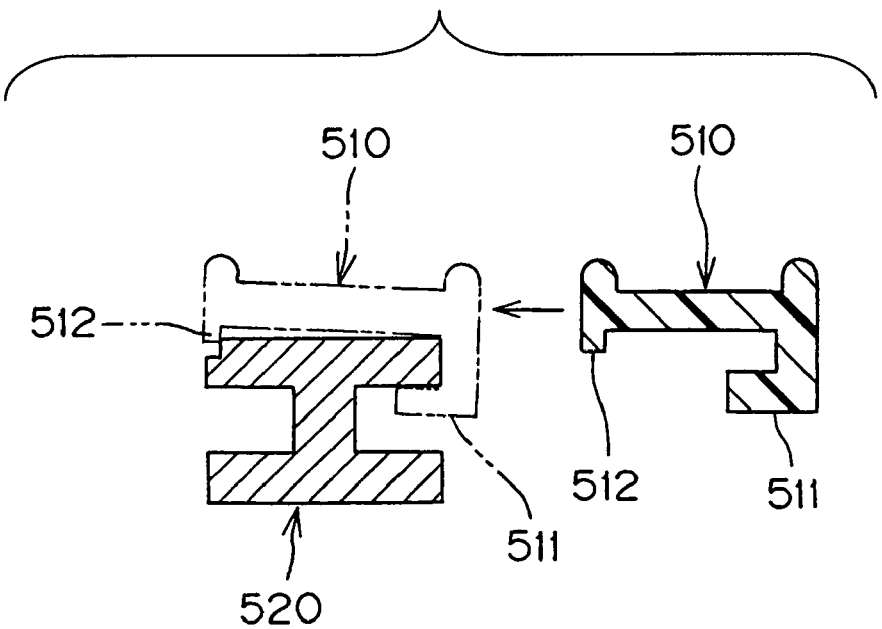
FIG. 8 is a cross-sectional exploded view of the guide of FIG. 7.
Figure 9:
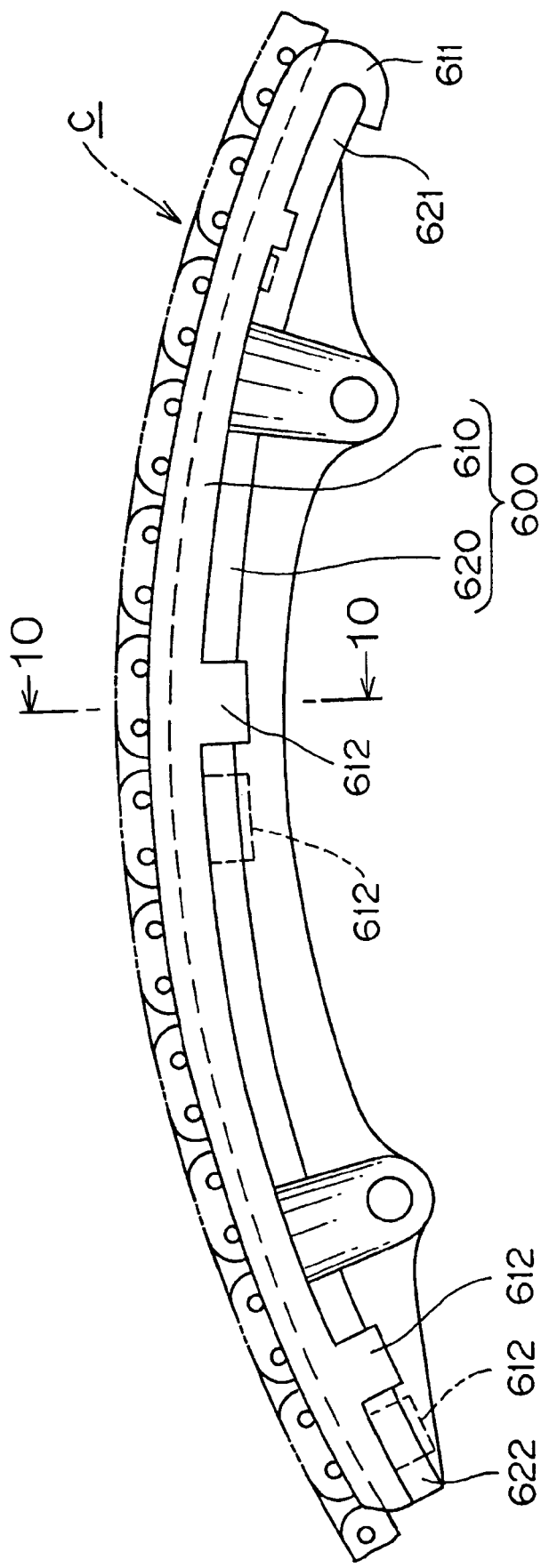
FIG. 9 is an elevational view of a conventional fixed guide.
Figure 10:
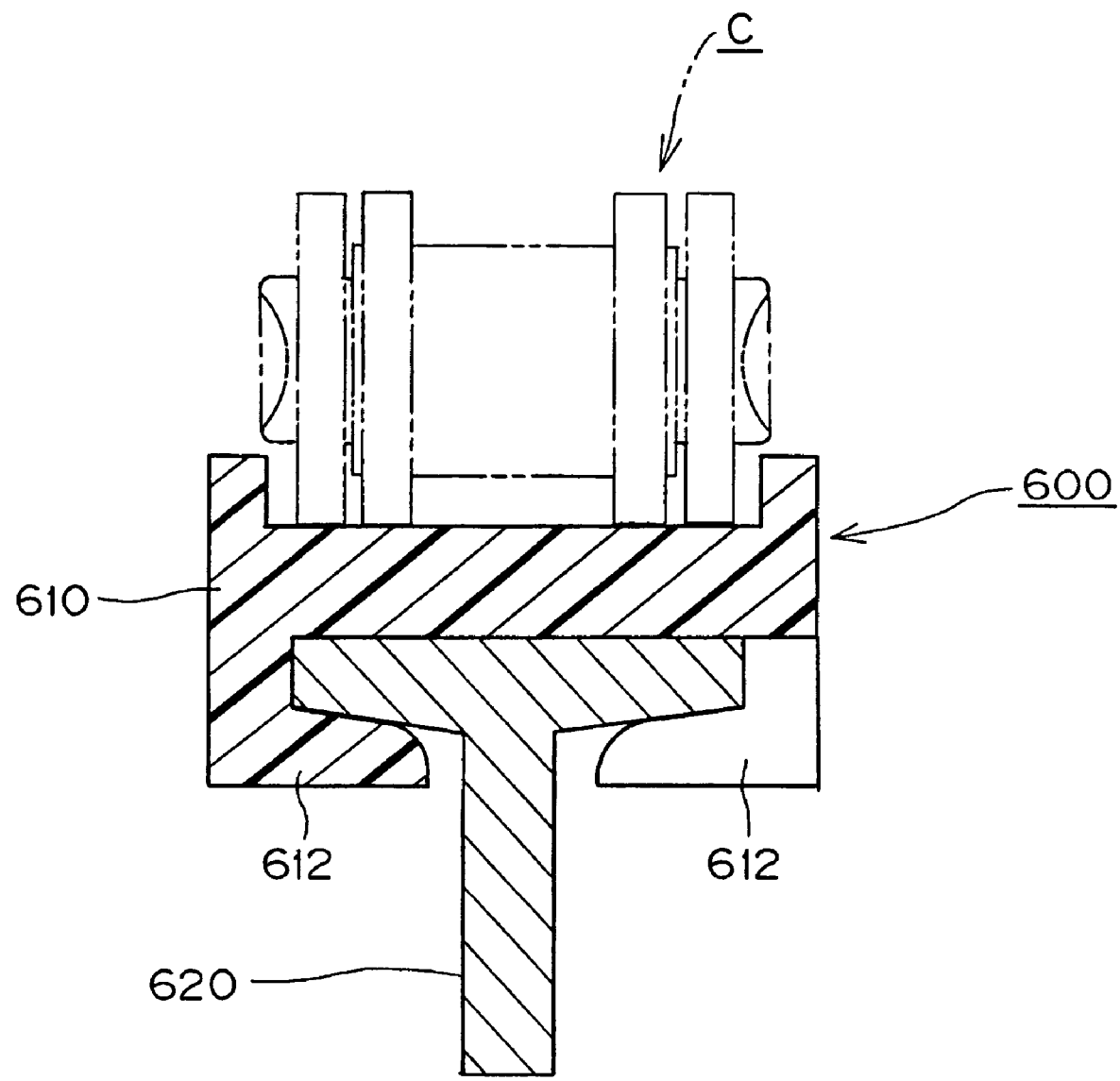
FIG. 10 is a cross-sectional view of the guide of FIG. 9, taken on section plane 10-10 in FIG. 9.

FIGS. 5 and 6 show further embodiments in which a bag-like receptacle is formed at one end of the shoe for receiving an end of the support arm. In FIG. 5, at one end of the shoe 210 the L-shaped protrusion 213b is partially enclosed at the end of the shoe to create a receptacle engageable with an end of the shoe, the receptacle extending part way across the width of the shoe 213. FIG. 6 shows a similar structure, in which protrusion 313b is formed so that the receptacle extends all the way across the width of the shoe 313. Receptacle 210 is open toward the edge of the shoe 213 having the strip shaped protrusion 214. Likewise receptacle 310 is open toward the edge of the shoe 313 having the strip shaped protrusion 314.

The shoes of FIGS. 5 and 6 can be attached to, and detached from a support arm in a manner similar to the manner in which the shoe of FIG. 3 is attached to and detached from its support arm. The L-shaped protrusions 213b and 313b exhibit greater strength and rigidity than the open L-shaped protrusion 113b in FIG. 3.

The arrangement of protrusions and notches in all of the embodiments described prevents the shoe from being installed backward on the support.

The shoe may be composed of any of a variety of synthetic resins such as a polyamide 6 resin, a polyamide 46 resin, a polyamide 66 resin, or a polyacetal resin capable of smooth sliding contact with a traveling transmission chain while allowing sufficient flexibility for attachment and detachment of the shoe from the support arm. On the other hand, the base should be made of a more rigid material such as metal or glass-fiber reinforced polyamide resin capable of exhibiting high endurance when subjected to changes in tension and changes in temperature encountered in the environment of an internal combustion engine.

Although the invention has been described in the context of a pivotable tensioner lever, it should be understood that the principles of the invention are applicable to fixed guides, and that most of the advantages of the invention can be realized in the case of a fixed guide.

The invention claimed is:

1. A sliding contact guide comprising:
   an elongated supporting arm having a front face, a back face, a first side and a second side, all extending longitudinally from a front end toward a back end, the first side having a first set of longitudinally spaced notches, and the second side having a second set of longitudinally spaced notches;
   an elongated, synthetic resin, shoe positioned on the front face of the elongated arm, the shoe having a surface against which an endless power transmission is slidable, the shoe having front and back ends adjacent the front and back ends of the arm respectively, and opposite first and second longitudinal edges adjacent the first and second sides of the arm respectively, each of said first and second longitudinal edges extending from the front end to the back end of the shoe, the shoe having a first set of protrusions consisting of a plurality of protrusions each extending from its first longitudinal edge into a notch of the first set, and a second set of protrusions consisting of a plurality of protrusions each extending from its second longitudinal edge into a notch of the second set, the protrusions of the first set being all of the protrusions extending from said first longitudinal edge into notches in said first side of the supporting arm, and the protrusions of the second set being all of the protrusions extending from said second longitudinal edge into notches in said second side of the supporting arm;
   wherein each of a plurality of the protrusions of the first set is an L-shaped protrusion having a leg engaged with the back face of the arm; and
   wherein a protrusion of the second set, longitudinally spaced from the L-shaped protrusions of the first set and disposed adjacent one end of the shoe, is also an L-shaped protrusion having a leg engaged with the back face of the arm, and each remaining protrusion of the second set is a strip-shaped protrusion extending substantially entirely in a direction perpendicular to the front face of the supporting arm and thereby being capable of moving into and out of a notch of the second set of notches along a direction substantially perpendicular to said front face upon a twisting movement of the shoe;
   whereby the shoe is held against longitudinal and lateral movement relative to the supporting arm by cooperation of the notches with the protrusions, and held against movement away from the front face of the supporting arm by engagement of legs of the L-shaped protrusions with the back face of the arm.

2. A sliding contact guide according to claim 1, including a receptacle formed on an end of the shoe remote from the L-shaped protrusion of the second set, the receptacle receiving one of the front and back ends of the support arm, the receptacle being open toward the second longitudinal edge of the shoe and open toward the end of the shoe adjacent the L-shaped projection of the second set.

3. A sliding contact guide according to claim 1, in which the sets of notches are disposed relative to each other so that, for each notch in one of the sets, a next notch, of the notches of said sets, proceeding longitudinally along the arm, is a notch of the other set, and, for each pair of adjacent notches of each set, a notch of the other set is disposed at a longitudinal position between the longitudinal positions of the notches of the pair.

4. A sliding contact guide comprising:
   an elongated supporting arm having a front face, a back face, a first side and a second side, all extending longitudinally from a front end toward a back end, the first side having a first set of longitudinally spaced notches, and the second side having a second set of longitudinally spaced notches;
   an elongated, synthetic resin, shoe positioned on the front face of the elongated arm, the shoe having a surface against which an endless power transmission is slidable, the shoe having front and back ends adjacent the front and back ends of the arm respectively, and opposite first and second longitudinal edges adjacent the first and second sides of the arm respectively, each of said first and second longitudinal edges extending from the front end to the back end of the shoe, the shoe having first and second L-shaped protrusions, each extending from its first longitudinal edge into a notch of the first set, a third L-shaped protrusion extending from its second longitudinal edge, at a location adjacent said back end of the shoe, into a notch of the second set, and first and second strip-shaped protrusions extending from the second edge of the shoe into notches of the second set;
   wherein each of the L-shaped protrusions has a leg engaged with the back face of the arm;
   wherein each of said strip-shaped protrusions extends substantially entirely in a direction perpendicular to the front face of the supporting arm and is thereby capable of moving into and out of a notch of the second set of notches along a direction substantially perpendicular to said front face upon a twisting movement of the shoe; and
   wherein the first L-shaped protrusion is located laterally opposite a location between the first and second strip-shaped protrusions, and the second L-shaped protrusion is located laterally opposite a location between the second strip-shaped protrusion and the third L-shaped protrusion, and wherein the third L-shaped protrusion is the only L-shaped protrusion extending from the second longitudinal edge of the shoe into a notch of the second set;
   whereby the shoe is held against longitudinal and lateral movement relative to the supporting arm by cooperation of the notches with the protrusions, and held against movement away from the front face of the supporting arm by engagement of legs of the L-shaped protrusions with the back face of the arm.

* * * * *